United States Patent [19]

Dudley

[11] Patent Number: 5,077,983
[45] Date of Patent: Jan. 7, 1992

[54] METHOD AND APPARATUS FOR IMPROVING EFFICIENCY OF A PULSED EXPANSION VALVE HEAT PUMP

[75] Inventor: Kevin F. Dudley, Cazenovia, N.Y.

[73] Assignee: Electric Power Research Institute, Inc., Palo Alto, Calif.

[21] Appl. No.: 620,096

[22] Filed: Nov. 30, 1990

[51] Int. Cl.⁵ .................................................. F25B 1/00
[52] U.S. Cl. ..................................... 62/228.1; 236/75; 251/129.05
[58] Field of Search .............. 62/190, 228.1; 236/75; 251/129.05, 129.08

[56] References Cited

U.S. PATENT DOCUMENTS

| | | | |
|---|---|---|---|
| 4,399,862 | 7/1983 | Hile | 62/158 X |
| 4,459,819 | 10/1984 | Hargraves | 62/212 |
| 4,651,535 | 7/1987 | Alsenz | |
| 4,685,309 | 3/1987 | Behr | 62/212 |
| 4,686,835 | 4/1987 | Alsenz | 62/223 |
| 4,697,431 | 9/1987 | Alsenz | 62/225 |
| 4,735,060 | 4/1988 | Alsenz | 62/225 |
| 4,838,037 | 6/1989 | Wood | 251/129.05 X |
| 4,873,838 | 1/1989 | Voorhis et al. | |

Primary Examiner—William E. Wayner
Attorney, Agent, or Firm—Wall and Roehrig

[57] ABSTRACT

During start up of a heat pump compressor that is controlled by a pulsed expansion valve system the discharge temperature sensor control of the pulse system is interrupted and a predetermined constant pulse is applied to the expansion valve increasing capacity and reducing loss of suction pressure resulting in improved cyclic system efficiency. The constant pulse control is applied only during start up until the discharge temperature reaches a predetermined level at which point control is returned to the discharge temperature sensor.

10 Claims, 3 Drawing Sheets

METHOD AND APPARATUS FOR IMPROVING EFFICIENCY OF A PULSED EXPANSION VALVE HEAT PUMP

BACKGROUND OF THE INVENTION

This invention relates generally to heat pump systems and, more particularly, to a heat pump for cooling a conditioned space and a method and apparatus for improving the cyclic efficiency by increasing capacity and reducing loss of suction pressure on start up.

In a typical refrigeration cycle, the refrigerant flow to the evaporator coil in a heat pump is metered by way of an expansion device which restricts the flow of refrigerant in a controlled manner to thereby control the amount of super heat in the system. Capillary tubes and thermal expansion valves are the most common types of expansion devices used in refrigeration systems and pulsed expansion valves are commonly used to control heat pump installations for use in widely varying environmental situations.

Recent control systems for heat pumps have tended toward variable speed compressors and pulse controlled expansion valves for optimizing the system parameters for the cooling and heating requirements of the conditioned space. In a typical system in which the expansion valve is pulsed to control the flow of refrigerant to the evaporator component, the expansion valve is pulsed under the control of a proportioned integral algorithm so as to control the compressor discharge temperature to maintain it at a target temperature which maximizes the steady state system efficiency. This has worked quite effectively for steady state operation in heat pump applications, but during start up of the heat pump, the expansion valve tends to remain closed because of the slow rise of the discharge temperature as the system is starting up. This causes low suction pressure and low capacity during this initial transient start up period and considerably reduces the overall efficiency of the system.

OBJECTS AND SUMMARY OF THE INVENTION

Accordingly, it is an object of the present invention to improve the efficiency of pulsed expansion valve controls for heat pump systems.

It is another object of the present invention to provide a heat pump system having greatly improved start up efficiency.

It is another object of the present invention to provide a control system for a heat pump that is simple and economical to manufacture.

It is yet another object of the present invention to provide a simplified control system for a pulsed expansion valve heat pump control system in which the efficiency of start up is significantly improved without the need for additional control valves or other control mechanisms.

It is a still further object of the present invention to improve the cyclic efficiency of a heat pump system.

This is accomplished in one embodiment of the present invention by providing a control system on start up that interrupts the discharge temperature control of the expansion valve and substitutes a constant duty cycle pulsing of the expansion valve until the discharge temperature reaches a predetermined value.

BRIEF DESCRIPTION OF THE DRAWINGS

Further objects of the invention, together with additional features and advantages thereof will be apparent from the following description of a preferred embodiment of the invention which is shown in the accompanying drawings, wherein.

DETAILED DESCRIPTION OF THE PREFERRED EMBODIMENT

Figure 1:
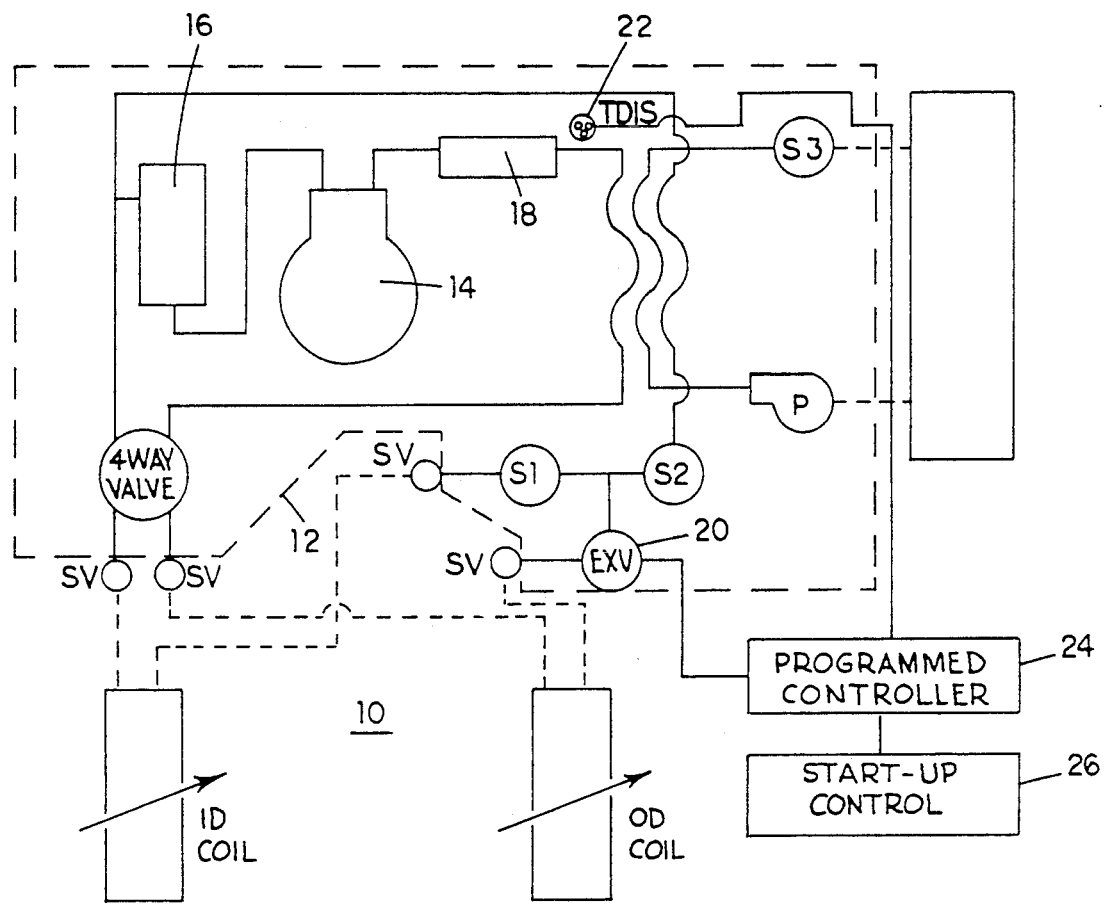
FIG. 1 is a block diagram of a heat pump showing the pulsed solenoid expansion valve controlled by the discharge temperature of the compressor.

Referring now to FIG. 1, there is shown in block diagram form a heat pump 10 according to the present invention. As may be seen, the compressor section 12 of this heat pump comprises the usual compressor 14, accumulator 16, muffler 18 and expansion valve 20. A discharge temperature sensor 22 is positioned adjacent the muffler exit and is adapted to sense the discharge temperature of the refrigerant as it leaves the compressor. The expansion valve 20 is controlled from a programed controller 24 which is also connected to the temperature sensor 22. The programed controller 24 is designed around a Proportioned Integral Algorithm commonly called a "PI Algorithm" that pulses the expansion valve 20 at a programed rate proportional to the discharge temperature so a to maintain the discharged refrigerant at a desired target temperature which will maximize the steady state system efficiency of the overall heat pump.

Figure 2C:
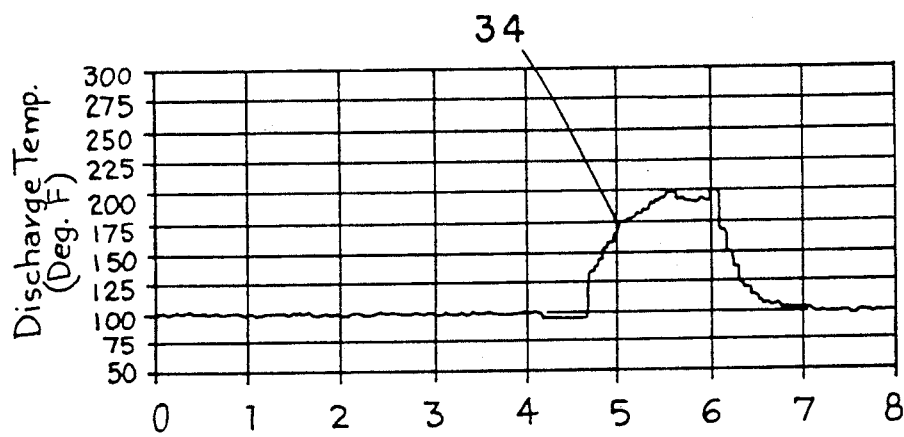
FIGS. 2 a-c show graphically the suction pressure, capacity, and discharge temperature of a system according to the prior art.
Figure 2B:
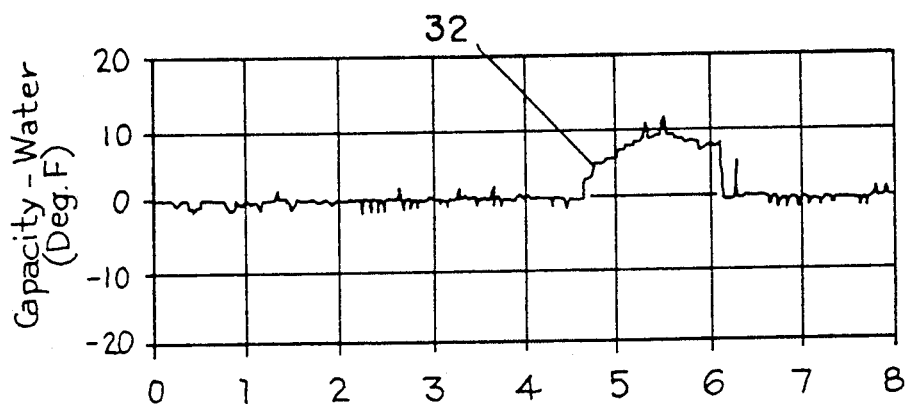
Figure 2A:
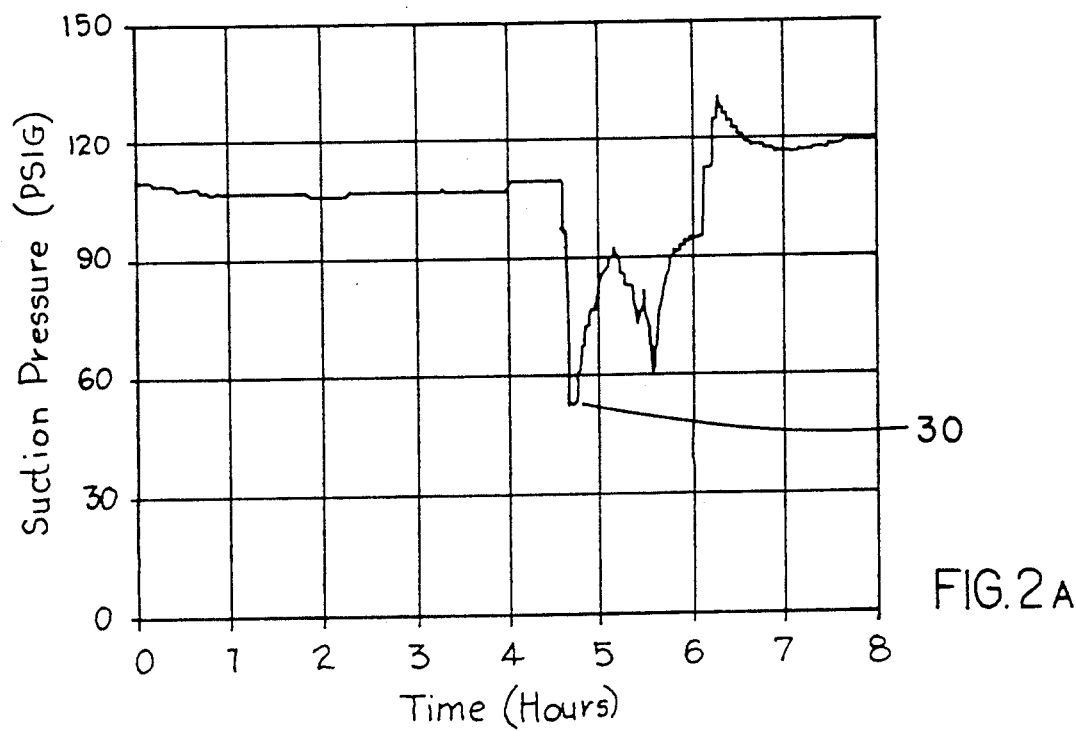

Because the control of the pulsed solenoid expansion valve is optimized for steady state operation, during start up as shown in FIG. 2, the capacity and the suction pressure are less than optimum from an efficiency standpoint. As may be seen in FIG. 2, when the compressor is started, the suction pressure drops very significantly at 30 and slowly builds back up causing the capacity 32 of the system to rise very slightly and slowly over time in proportion to the rise in discharge temperature 34 as the compressor continues to operate and to achieve steady state condition. This limitation of the suction pressure and capacity is caused because under the PI algorithm the expansion valve basically remains shut during the early start up phase of the cycle with only the bypass refrigerant going through the system to the evaporator coil and back to the compressor.

When a system is operating, the refrigerant is distributed throughout the system in accordance with the basic principles of operation of a heat pump system. On shutdown, the refrigerant tends to collect in pools at the coldest sections of the system. On start-up the refrigerant must be redistributed throughout the system and heretofore this has taken considerable time with a consequent penalty to efficiency.

Figure 3C:
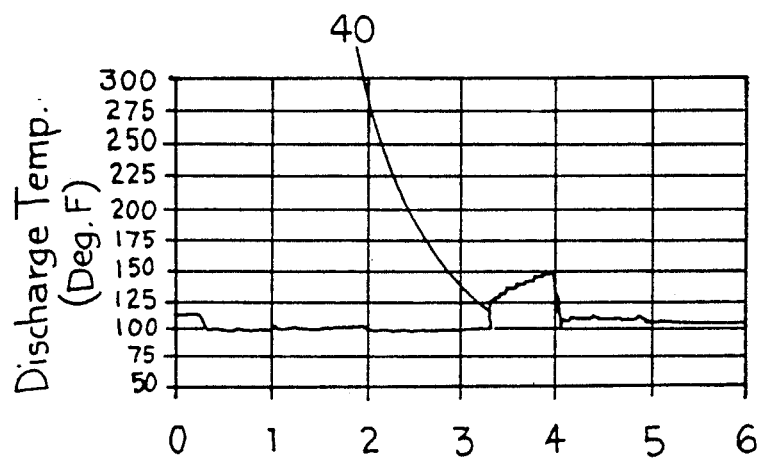
FIGS. 3 a-c are views similar to FIGS. 2 a-c of a system modified in accordance with the present invention.
Figure 3B:
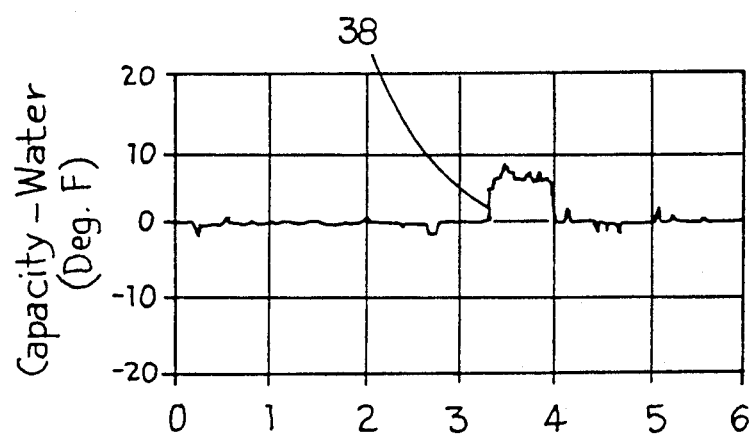
Figure 3A:
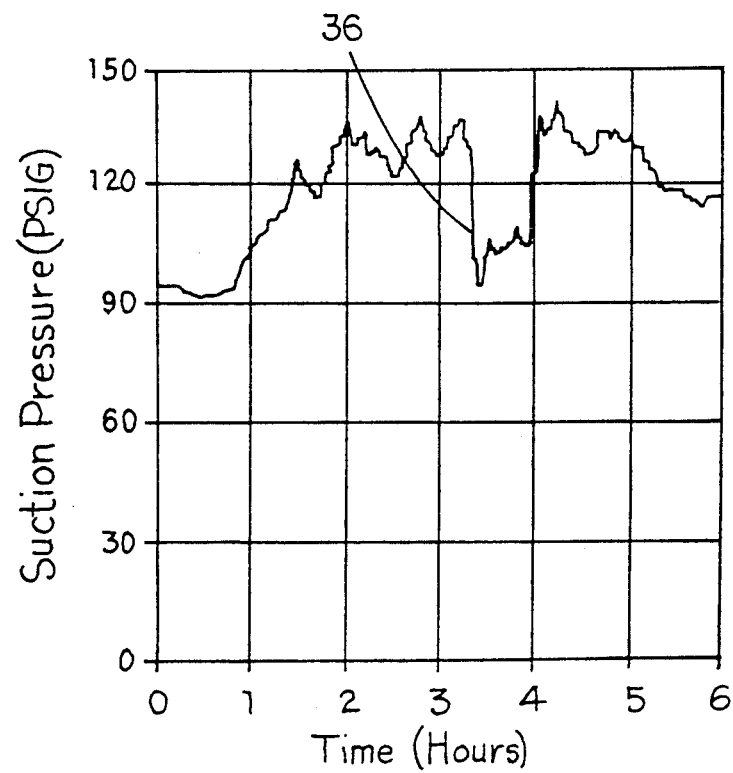

It has been found, according to the present invention that if control is taken away from the refrigerant discharge temperature sensor 22 and a predetermined constant duty cycle pulsing of the solenoid valve 20 by start u control 26 is undertaken that the rise in capacity 38 is steepened very substantially and the drop in suction pressure 36 is reduced, which together cause the discharge temperature 40 to increase in a step function. In effect, the redistribution of refrigerant is speeded up and facilitated by the present invention. This is shown graphically in FIG. 3 where it can be seen that with a constant duty cycle pulsing the capacity increases almost in a step function and the discharge temperature follows very closely thereafter. This steep and very rapid increase in capacity and discharge temperature also limits the suction pressure drop and therefore greatly increases overall efficiency of the control system for the heat pump. The cyclic efficiency of the heat pump is increased by some five to ten percent on each cycle which, over time, adds up to a very significant savings in energy costs for operating the heat pump.

The precise duty cycle for the pulsing of the expansion valve 20 is determined experimentally for each particular system to meet standard DOE cyclic test conditions for cooling at 67° F. outdoor temperature. The controller 24 duty cycle of the pulsing of the expansion valve is chosen to maximize the start up cyclic efficiency of the particular system in question. Once the basic heat pump system parameters are established the duty cycle of the constant pulse rate for the pulsed expansion valve can be varied until the optimum efficiency is obtained for the cycle of the heat pump. Duty cycles within the range of 30% to 70% have been found to be satisfactory depending on the particular system parameters As shown in FIG. 1, this is accomplished by a simple control in which a control circuit is used to interrupt the discharge temperature sensor control of the pulse system and to substitute a predetermined duty cycle constant pulsing of the expansion valve to effect the indicated change in parameters. Once the discharge temperature reaches the steady state operating temperature or some predetermined point approaching that, control is returned back to the discharge temperature sensor and the start up control circuit is no longer in the control loop. The start up circuit is then maintained out of the control loop until such time as the compressor is again shut off and it is desired to restart it. Suitable time delay and latching mechanisms are provided in the start up control circuit to prevent triggering of the start up function during normal on/off steady state operation of the compressor while it is under the control of the discharge temperature sensor.

We have thus provided a simple yet effective means of increasing the cyclic efficiency of a pulsed expansion valve type of control circuit for heat pumps.

While this invention has been explained with reference to the structure disclosed herein, it is not confined to the details as set forth and this application is intended to cover any modifications and changes as may come within the scope of the following claims.

What is claimed is:

1. In a heat pump system for cooling a conditioned space having a pulsed solenoid expansion valve controlled by a discharge temperature based PI algorithm the method of improving efficiency of operation which comprises the steps of:
   interrupting the discharge temperature sensor control of the pulsed expansion valves during start up;
   pulsing the expansion valve during start up at a predetermined constant duty cycle; and
   terminating the constant duty cycle and reestablishing discharge temperature sensor control thereof upon reaching a predetermined compressed refrigerant discharge temperature.

2. The method of claim 1 further including selecting the predetermined constant duty cycle to maximize start up efficiency for each individual heat pump system.

3. The method according to claim 2 further including selecting a constant duty cycle between 30% and 70%.

4. The method according to claim 2 wherein said constant duty cycle is chosen to maximize system capacity and minimize suction pressure loss.

5. The method according to claim 1 further including choosing the constant duty cycle for pulsing the expansion valve to cause the system capacity to increase in a step function on start up.

6. The method of claim 1 further including terminating the constant duty cycle pulsing of the expansion valve when the discharge temperature reaches 160° F.

7. In a heat pump system for cooling a conditioned space having a pulsed solenoid expansion valve controlled by a discharge temperature based PI algorithm apparatus for controlling the operation of a heat pump compressor which comprises:
   a solenoid operated expansion valve connected to the compressor and cooling coil of the heat pump;
   a temperature sensor positioned to sense refrigerant discharge temperature;
   first means for pulsing said expansion valve at a first predetermined rate;
   second means responsive to said temperature sensor for pulsing said expansion valve at a second predetermined rate; and
   control means for selecting said first or second means for pulsing said expansion valve, depending on the discharge temperature.

8. The apparatus according to claim 7 further including biasing means for causing said control means to select said first means for pulsing said expansion valve during start up of the heat pump system.

9. The apparatus according to claim 8 wherein said first means for pulsing said solenoid is operated at a constant duty cycle.

10. The apparatus according to claim 9 wherein said first pulsing means has a duty cycle of from 30% to 70%.

* * * * *